United States Patent
Ohji et al.

[19]

[11] Patent Number: 6,155,301

[45] Date of Patent: Dec. 5, 2000

[54] ACCUMULATOR INCLUDING DEVICE FOR PERMITTING AND INHIBITING FLUID FLOW INTO FLUID CHAMBER

[75] Inventors: Akira Ohji, Inuyama; Akira Katagiri, Utsunomiya, both of Japan

[73] Assignee: Tokai Rubber Industries, Ltd., Japan

[21] Appl. No.: 09/239,343

[22] Filed: Jan. 28, 1999

[51] Int. Cl.[7] .................................................. F16L 55/04
[52] U.S. Cl. ............................................. 138/30; 138/31
[58] Field of Search ........................................ 138/30, 31

[56] References Cited

U.S. PATENT DOCUMENTS

| | | | |
|---|---|---|---|
| 3,493,001 | 2/1970 | Bevandich | 138/30 |
| 3,868,972 | 3/1975 | Zirps | 138/30 |
| 4,068,684 | 1/1978 | Greer | 138/30 |
| 4,195,668 | 4/1980 | Lewis | 138/30 |
| 4,386,627 | 6/1983 | Lachaux | 138/30 |
| 4,527,580 | 7/1985 | Chheda | 138/30 |
| 6,003,555 | 12/1999 | Sheng | 138/30 |

FOREIGN PATENT DOCUMENTS

| | | |
|---|---|---|
| 0 533 527 | 3/1993 | European Pat. Off. . |
| 2 757 223 | 6/1998 | France . |
| 2 007 403 | 5/1979 | United Kingdom . |
| 93 03301 | 2/1993 | WIPO . |

*Primary Examiner*—James Hook
*Attorney, Agent, or Firm*—Burr & Brown

[57] ABSTRACT

An accumulator comprising: (a) a vessel body having an inner space; (b) a deformable partition member fixedly disposed in the inner space so as to fluid-tightly divide the inner space into a gas chamber charged with a suitable pressurized gas, and a fluid chamber connectable through a communicating passage with a piping system for permitting flows of a working fluid through the communicating passage between the piping system and the fluid chamber in response to variations of the pressure of the working fluid, so as to minimize the variations; and (c) an opening and closing device disposed in the communicating passage, the opening and closing device opening the communicating passage thereby to permit the flows of the working fluid except when a rate of increase of the pressure of the working fluid is higher than a predetermined upper limit, the opening and closing device closing the communicating passage thereby to inhibit the flows of the working fluid when the rate is higher than the predetermined upper limit.

16 Claims, 8 Drawing Sheets

ACCUMULATOR INCLUDING DEVICE FOR PERMITTING AND INHIBITING FLUID FLOW INTO FLUID CHAMBER

BACKGROUND OF THE INVENTION

1. Field of the Invention

The present invention relates in general to an accumulator, and is more particularly concerned with an improved construction of an accumulator which comprises a vessel body having an inner space, and a deformable or displaceable partition member disposed in the inner space so as to divide the inner space into a gas chamber charged with a suitable pressurized gas, and a fluid chamber which communicates with the piping system of a hydraulic circuit.

2. Discussion of the Related Art

There is known an accumulator connectable to the piping system of a hydraulic circuit, for reducing or minimizing problematic vibrations and noises in the hydraulic circuit which are caused by variations of the fluid pressure in the piping system due to a periodic change of the delivery pressure of a pump employed in the hydraulic circuit, in other words, which are caused by pressure pulsation or pulsating flow of the oil in the piping system.

Such an accumulator includes a vessel body having an inner space and a deformable partition member disposed in the inner space so as to fluid-tightly divide the inner space into two sections, i.e., a gas chamber and a fluid chamber. The gas chamber is filled with a nitrogen gas or other suitable gaseous component which is pressurized to a suitable pressure. The fluid chamber communicates with the piping system. That is, in response to the variations of the fluid pressure in the piping system, the oil as the working fluid is discharged from the piping system into the fluid chamber, or alternatively the oil in the fluid chamber is discharged or delivered into the piping system, whereby the variations of the fluid pressure are minimized. The thus constructed accumulator, when connected to the piping system of the hydraulic circuit, is effective to absorb or accommodate the pulsating flow of the fluid in the piping system, and thereby reduce or alleviate the vibrations and noises caused by the pulsating flow.

However, the hydraulic circuit to which this conventional accumulator is connected has a difficulty when it is required to efficiently provide a sufficiently large hydraulic force, particularly where it is required to generate or establish such a large hydraulic force in a relatively short time.

For permitting rapid generation of the large force in the hydraulic circuit, the fluid pressure in the piping system is required to be rapidly increased. However, the presence of the conventional accumulator in the hydraulic circuit undesirably impedes the required rapid increase in the fluid pressure. That is, upon initiation of the increase in the fluid pressure in the piping system, the oil in the piping system is forced into the fluid chamber of the accumulator, and the increase of the fluid pressure in the piping system is accordingly offset by an amount equivalent to the amount of oil flow into the fluid chamber. As a consequence, the hydraulic circuit with the conventional accumulator installed therein cannot provide the required amount of hydraulic force.

SUMMARY OF THE INVENTION

It is therefore an object of the present invention to provide an accumulator which is connectable to a hydraulic circuit and which permits efficient and rapid generation of a sufficiently large hydraulic force in the hydraulic circuit, in a case where the large hydraulic force needs to be rapidly generated, while reliably absorbing or reducing the pulsating flow of the fluid in the hydraulic circuit.

This object may be achieved according to the principle of the present invention, which provides an accumulator connectable to a piping system of a hydraulic circuit for minimizing variations of the pressure of a working fluid in the piping system, comprising: (a) a vessel body having an inner space; (b) a displaceable partition member fixedly disposed in the inner space so as to fluid-tightly divide the inner space into a gas chamber charged with a suitable pressurized gas, and a fluid chamber connectable through a communicating passage with the piping system for permitting flows of the working fluid through the communicating passage between the piping system and the fluid chamber in response to the variations, so as to minimize the variations; and (c) an opening and closing device disposed in the communicating passage, the opening and closing device opening the communicating passage thereby to permit the flows of the working fluid between the piping system and the fluid chamber except when a rate of increase of the pressure of the working fluid is higher than a predetermined upper limit, the opening and closing device closing the communicating passage thereby to inhibit the flows of the working fluid between the piping system and the fluid chamber when the rate is higher than the predetermined upper limit.

In the accumulator of the present invention constructed as described above, the communicating passage is held open by the opening and closing device, thereby permitting the fluid communication through the communicating passage between the piping system and the fluid chamber, in a normal operation state in which the fluid pressure in the piping system is not rapidly or abruptly increased. In this normal operation state in which the rate of increase of the pressure of the fluid in the piping system is not higher than a predetermined upper limit, the fluid such as an oil is permitted to flow from the piping system into the fluid chamber, or vice versa, depending upon the variations of the fluid pressure, namely, depending upon whether the pressure of the fluid in the fluid chamber is higher or lower than that in the piping system. On the other hand, when the fluid pressure is rapidly increased, that is, when the rate of increase of the fluid in the piping system is higher than the upper limit, the communicating passage is instantaneously closed by the opening and closing device, thereby inhibiting the fluid communication through the communicating passage between the piping system and the fluid chamber.

Namely, the present accumulator functions to minimize the variations of the fluid pressure in its normal operation state, but is capable of instantaneously suspending its function of minimizing the variations of the fluid pressure in the event of a rapid increase of the fluid pressure in the piping system, thereby effectively preventing the conventionally experienced problem that a flow of the fluid from the piping system into the fluid chamber prevents a required rapid increase of the hydraulic force generated by the hydraulic circuit.

The present accumulator is accordingly capable of not only advantageously absorbing or reducing the pulsating flow of the fluid, so as to effectively minimize the vibrations and noises in the hydraulic circuit which would be caused by the pulsating flow during the normal operation of the hydraulic circuit, but also highly efficiently enabling the hydraulic circuit to generate a required large hydraulic force with higher response.

According to a first preferred feature of the invention, the opening and closing device comprises a shut-off valve including a valve member which is movable in opposite directions, so that the communicating passage is opened by a first movement of the valve member in one of the opposite directions in which the working fluid is discharged from the fluid chamber into the piping system, and so that the communicating passage is closed by a second movement of the valve member in the other of the two opposite directions.

In this first preferred feature of the invention, the valve member of the shut-off valve of the opening and closing device is moved in the direction in which the working fluid is admitted into the fluid chamber when the fluid pressure is increased at a rate higher than the predetermined upper limit, thereby, reliably closing the communicating passage. Thus, the accumulator constructed according to this first feature of the invention has improved operating response, permitting the hydraulic circuit to generate the required large hydraulic force in a short time.

According to one preferred form of the first feature of the invention, the opening and closing device further comprises a biasing mechanism which biases the valve member in one of the two opposite directions with a biasing force, such that the valve member is held by the biasing force in an open position thereof after the first movement, except when the rate of increase of the pressure of the working fluid is higher than the upper limit, and such that the second movement of the valve member to a closed position thereof in the other of the two opposite directions against the biasing force is permitted when the rate of increase is higher than the upper limit.

In this preferred form of the first feature of the invention, the valve member is held biased by the biasing mechanism in the direction in which the working fluid is discharged from the fluid chamber into the piping system. However, the valve member is moved against the biasing force of the biasing mechanism in the direction in which the working fluid is admitted into the fluid chamber when the fluid pressure in the piping system is increased at a rate higher than the predetermined upper limit. That is, the biasing force generated by the biasing mechanism is adjusted so as to permit the valve member to be moved against the biasing force, i.e., in the direction opposite to the biasing direction of the biasing mechanism, when the increase rate of the fluid pressure exceeds the predetermined upper limit. It is noted that the biasing mechanism may be a compression coil spring, for example, although the construction of the biasing mechanism is not particularly limited.

According to an arrangement of the preferred form of the first feature of the invention, the shut-off valve further includes a valve seat having at least one communicating hole formed therethrough for fluid communication with the fluid chamber and the communicating passage, the valve member being seated on the valve seat so as to close the at least one communicating hole, as a result of the second movement of the valve member to the closed position, when the rate of increase of the pressure of the working fluid is higher than the upper limit.

In this advantageous arrangement of the preferred form of the first feature of the invention, the contact surface of the valve is preferably formed to follow the shape of the valve member. For example, where the valve member takes the form of a ball, the contact surface of the valve member preferably has a part-spherical surface that is concave in the direction in which the working fluid is admitted into the fluid chamber, so that the ball-like valve member is fluid-tightly seated on the valve seat, thereby further reliably closing the communicating passage when the rate of increase of the fluid pressure is higher than the predetermined upper limit.

While the valve member preferably has a ball-like shape, for example, the shape of the valve member is not particularly limited. For example, the valve member may consist of a stepped cylindrical member movably disposed in the communicating passage, the stepped cylindrical member including a head portion having a flat end face, and a shaft portion having a smaller diameter than the head portion and extending from a center of the flat end face of the head portion, and wherein the valve seat has a central accommodation hole, the shaft portion being moved into the accommodation hole while the head portion is seated on the seat member at the closed position so as to close the at least one communicating hole.

Further, in the above-described arrangement, the accumulator preferably further includes a stop mechanism which limits the amount of the first movement of the valve member in the direction in which the working fluid is discharged from the fluid chamber into the piping system.

The construction of the stop mechanism is not particularly limited. However, where the valve has the ball-like shape, the stop mechanism preferably includes a plurality of protrusions which are located on one of opposite sides of the ball which is remote from the valve seat. Each of the protrusions protrudes radially inwardly from an inner circumferential surface of a cylindrical wall which defines the communicating passage. The plurality of protrusions are spaced apart from each other in a circumferential direction of the cylindrical wall. In this case, the ball has a diameter larger than that of a circle generally defined by radial inner ends of the plurality of protrusions.

According to a second preferred feature of the invention, the accumulator further comprises a fitting having an axially extending through-hole formed therethrough and attached to the vessel body such that the fluid chamber is connectable to the piping system through the axially extending through-hole which serves as the communicating passage.

According to one preferred form of the above-indicated second feature of the invention, the fitting includes a diametrically large portion and a diametrically small portion which is located on one of axially opposite sides of the diametrically large portion which is remote from the vessel body, an outer circumferential surface of the diametrically large portion and an outer circumferential surface of the diametrically small portion being connected by an annular shoulder face which is substantially perpendicular to an axial direction of the fitting, the diametrically small portion having an externally threaded distal end portion for fluid-tight communication with the piping system, and an axially intermediate portion having at least one radially extending through-hole formed through a cylindrical wall thereof so as to extend in a radial direction of the fitting, for fluid-tight communication with the piping system.

The accumulator constructed according to this preferred form of the second feature of the invention is connected or attached to the piping system or installed in the hydraulic circuit in a simplified manner. This advantage of the preferred form of the second feature of the invention can be greatly enjoyed, for example, according to another aspect of this invention, which provides a hydraulic system including: (a) an accumulator constructed according to the present invention as described above, (b) a distributing pipe including a tubular portion and a generally annular terminal portion at an axial end thereof, the generally annular terminal portion having an axis substantially perpendicular to an axis of the tubular portion, an inside diameter substantially equal to an outside diameter of the diametrically small portion of the fitting, and an annular groove which is formed in an inner circumferential surface of an axially intermediate part thereof and which communicates with a distributing passage of the tubular portion, the distributing pipe being attached to the fitting, such that the generally annular terminal portion is fitted on the diametrically small portion, such that one of axially opposite faces of the generally annular terminal portion is in contact with the annular shoulder face of the fitting, and such that the annular groove communicates with the at least one radially extending through-holes of the fitting; and (c) a delivery pipe connected at one end thereof to a pump and having an internally threaded end portion remote from the one end, the internally threaded end portion being screwed onto the externally threaded distal end portion of the fitting such that the generally annular terminal portion of the delivery pipe is gripped by and between the annular shoulder face and an axial end face of the internally threaded end portion.

In this hydraulic system, the accumulator is directly attached at the fitting to the delivery pipe and the distributing pipe, in the simplified manner, without any additional member.

BRIEF DESCRIPTION OF THE DRAWINGS

The above and optional objects, features, advantages and technical and industrial significance of the present invention will be better understood by reading the following detailed description of presently preferred embodiments of the invention, when considered in connection with the accompanying drawings, in which.

DETAILED DESCRIPTION OF THE PREFERRED EMBODIMENT

Figure 1:
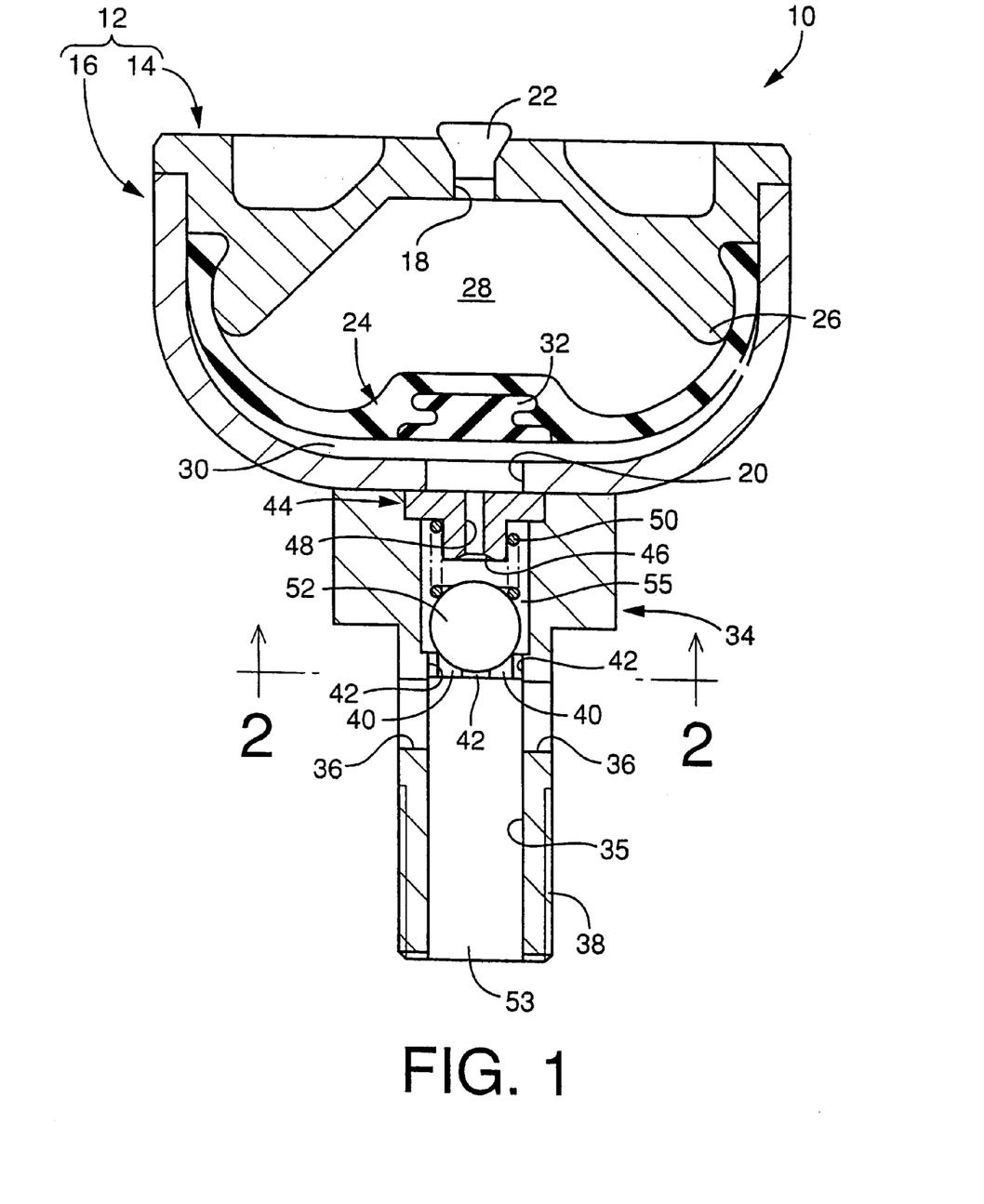
FIG. 1 is an elevational view in longitudinal or axial cross section of an accumulator constructed according to a first embodiment of the present invention.

Referring first to FIG. 1, there is shown an accumulator 10 which is constructed according to a first embodiment of this invention. As is clear from FIG. 1, the accumulator 10 includes a vessel body 12 which is principally composed of a thick-walled, disk-shaped upper member 14 and a cup-shaped lower member 16. The upper and lower members 14, 16 are fixed to each other as a single unit, such that the upper opening of the lower member 16 is entirely covered by the upper member 14. The two members 16, 14 are fixed to each other by suitable means, for example, by welding, and cooperate with each other to constitute the vessel body 12 having an inner space.

The thick-walled, disk-shaped upper member 14 has in a central portion thereof a gas inlet 18 which is formed through the upper member 14 so as to extend in the thickness direction of the upper member 14. The cup-shaped lower member 16 also has in a center thereof a fluid flow opening 20 which is formed through the lower member 16 so as to extend in the thickness direction of the lower member 16. The provision of the gas inlet 18 and the fluid flow opening 20 in the respective upper and lower members 14, 16 permit the inner space of the vessel body 12 to communicate, at the upper and lower portions, with the exterior of the vessel body 12. It is noted that the gas inlet 18 which is located in the upper portion is air-tight closed by a plug 22.

The accumulator 10 further includes a deformable partition member in the form of a flexible diaphragm 24 which is fixedly disposed in the inner space of the vessel body 12 such that the inner circumferential surface of the lower member 16 is substantially entirely covered by the flexible diaphragm 24. This flexible diaphragm 24 is made of a known composite material composed of a resin and a rubber and having a low degree of gas permeability. The upper member 14 has an annular, projecting portion 26 which projects downward from the periphery of the lower face of the upper member 14. This projecting portion 26 cooperates with the inner circumferential surface of the opening portion of the lower member 16 to fixedly grip therebetween the flexible diaphragm 24.

The flexible diaphragm 24 serves as the partition member for dividing the inner space of the vessel body 12 into two fluid-tight sections which are arranged in vertical or axial direction. An upper one of the two sections which is defined by the flexible diaphragm 24 and the upper member 14 serves as a gas chamber 28, while a lower one of the two sections which is defined by the flexible diaphragm 24 and the lower member 16 serves as a fluid chamber 30. The gas chamber 28 is filled or charged with a nitrogen gas or other suitable gaseous component which is pressurized to a predetermined value, and the gas inlet 18 is gas-tight closed by the plug 22. The fluid chamber 30 is connected to the piping system of a hydraulic circuit so that a pressurized working fluid such as a pressurized oil passing through the piping system can be introduced into the fluid chamber 30 through the fluid flow opening 20 which is formed through the lower member 16. The flow of the pressurized working fluid into the fluid chamber 30 causes the flexible diaphragm 24 to be upwardly deformed or displaced. The projecting portion 26, which cooperates with the inner circumferential surface of the opening portion of the lower member 16 to fixedly grip therebetween the flexible diaphragm 24, has an inner circumferential surface shaped to follow the upwardly deformed shape of the flexible diaphragm 24 during the fluid flow into the fluid chamber 30. It is noted that the reference numeral 32 designates an anti-extrusion button or poppet.

A substantially cylindrical fitting 34 is mounted on the lower member 16 of the vessel body 12 constructed as described above, in such a way that an axially extending through-hole 35 formed through the fitting 34 is radially aligned with the fluid flow opening 20. The fitting 34 has a diametrically large, upper portion and a diametrically small, lower portion whose diameter is smaller than the diametrically large, upper portion, and is fixed at an upper end face thereof to the lower face of the lower member 16, by suitable means, for example, by welding. The fitting 34 has, in the lower portion, two radially extending through-holes 36, 36 each of which is formed through the cylindrical wall so as to extend in the radial direction, such that the two through-holes 36, 36 are angularly spaced apart from each other by 180° in the circumferential direction. Further, the fitting 34 has an externally threaded portion 38 which is formed on the outer circumferential surface at the distal end of the lower portion, and which extends in the longitudinal or axial direction over a predetermined distance.

Figure 2:
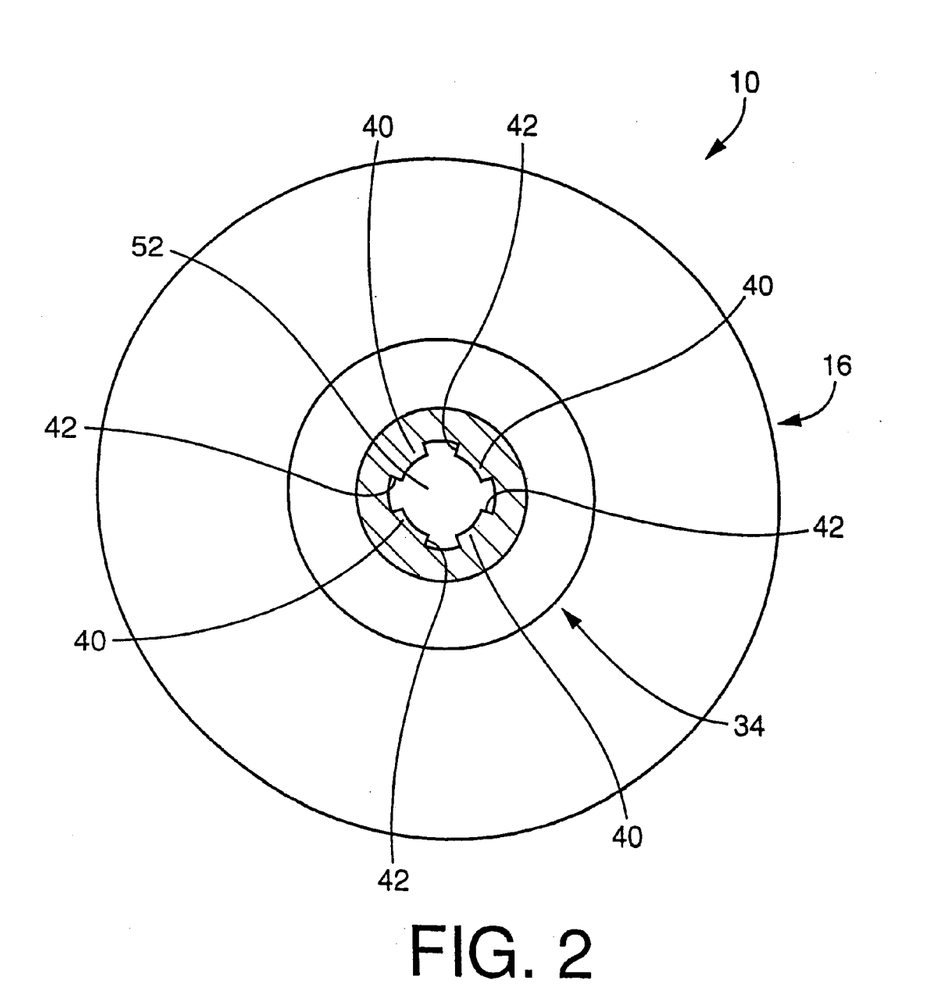
FIG. 2 is a cross sectional view taken along line 2—2 of FIG. 1.

As is clear from FIG. 2, the fitting 34 further has four protrusions 40 integrally formed on the inner circumferential surface at the substantially proximal end of the lower portion. Each of the four protrusions 40 is located axially adjacent to, i.e., just above the radially extending through-holes 36, 36, and radially inwardly protrudes from the inner circumferential surface of the fitting 34 over a predetermined distance and extends in the circumferential direction over a predetermined distance. The four protrusions 40 are equi-angularly spaced apart from each other, thereby providing four recesses 42 each located between the circumferentially adjacent two of the protrusions 40.

A valve seat 44 is disposed in the upper open end portion of the axially extending through-hole 35 of the fitting 34, as shown in FIG. 1, so as to close the upper open end of the axially extending through-hole 35. The valve seat 44 has at its lower face a part-spherical surface 46 which is upwardly concave, and at the center an axially-extending communicating hole 48 formed therethrough. The axially extending through-hole 35 of the fitting 34 communicates with the fluid chamber 30 of the vessel body 12 only via the communicating hole 48 of the valve seat 44.

Within the axially extending through-hole 35 of the fitting 34, there are also disposed a biasing mechanism in the form of a coil spring 50 and a valve member in the form of a ball 52. The coil spring 50 and the ball 52 are positioned relative to each other in the vertical direction, between the valve seat 44 and the above-described four protrusions 40. The coil spring 50 is compressible in the vertical direction, and the ball 52 is accordingly displaceable in the vertical direction. The ball 52 has a diameter larger than a space defined or surrounded by the radially inner ends of the respective four protrusions 40, so that the ball 52 is not permitted to pass through the space. Further, the ball 52 has a spherical surface which corresponds to the above-described part-spherical surface 46 of the valve seat 44. The coil spring 50 is unremovably engaged at its upper end with the valve seat 44, and is normally held in contact at its lower end with the spherical surface of the ball 52. The ball 52, which is thus in contact at its upper portion with the coil spring 50, is brought into contact and engagement at its lower portion with the upper edges of the radially inner ends of the respective four protrusions 40. The ball 52 and the valve seat 44 cooperate to constitute a shut-off valve which is normally held in its open state, in a normal operating state of the accumulator. In this open state, the coil spring 50 is compressed by a suitable amount to produce a suitable biasing force acting on the ball 52. In other words, the amount of compression or the biasing force of the coil spring 50 is determined to hold the shut-off valve in its open state as long as the accumulator is in the normal operating state.

Figure 4:
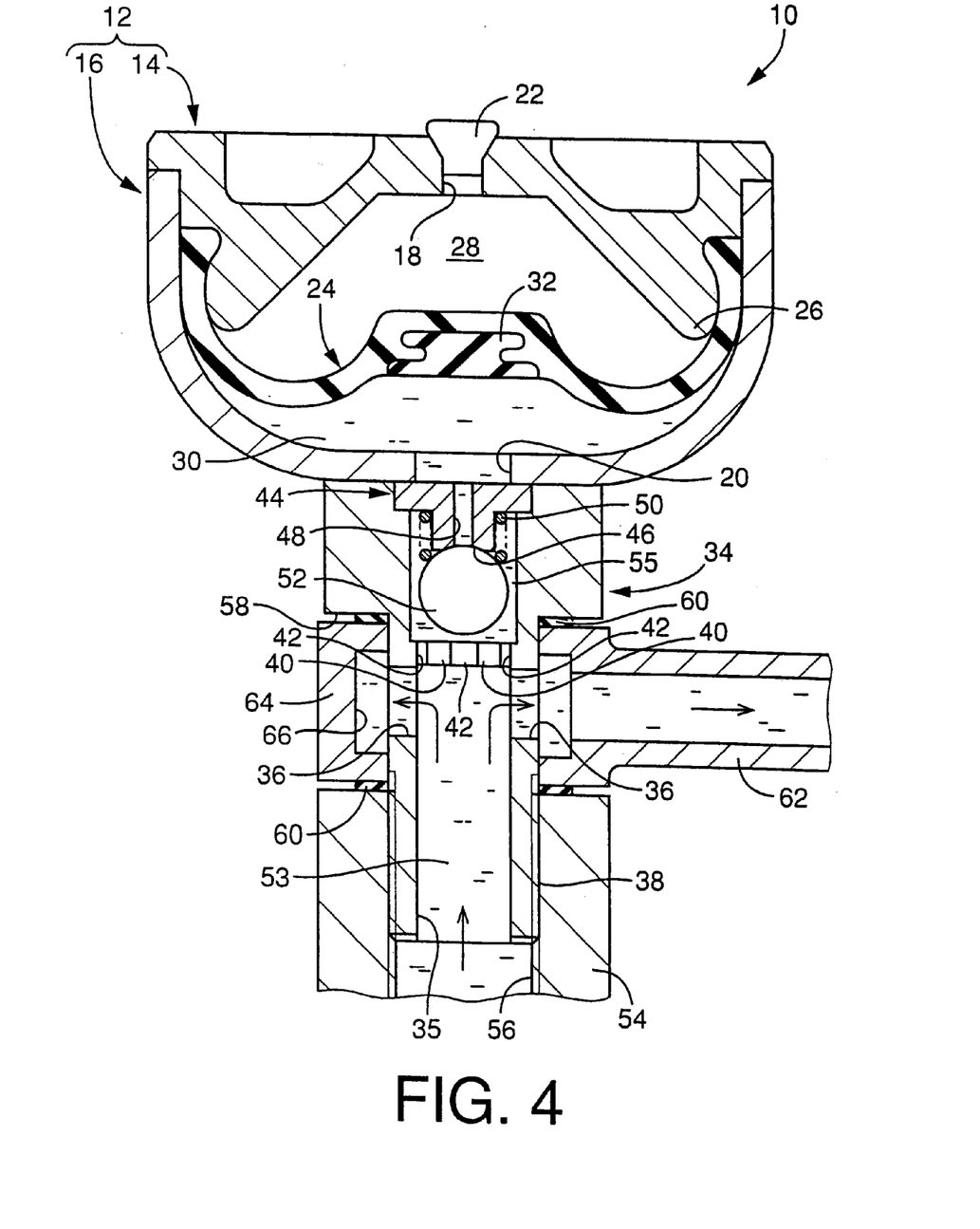
FIG. 4 is an elevational view in longitudinal or axial cross section showing the accumulator of FIG. 1 as connected to the hydraulic circuit, in another operating state of the valve while the fluid pressure in the piping system of the hydraulic circuit is rapidly increasing.

According to this arrangement, the ball 52 within the axially extending through-hole 35 of the fitting 34 is biased by the coil spring 50 in the downward direction, i.e., in a direction away from the valve seat 44, and is therefore forced with the predetermined biasing force of the coil spring 50, so as to be held in contact and engagement with the upper edges of the radially inner ends of the respective four protrusions 40. Thus, a lower portion 53 of the axially extending through-hole 35 provided with the two radially extending through-holes 36 communicates with an upper portion 55 of the axially extending through-hole 35 which is provided with the valve seat 44, through the above-described four recesses 42 located between the upper and lower portions 55, 53. The upper portion 55 communicates with the fluid chamber 30 through the communicating hole 48 of the valve seat 44. When a force acting on the ball 52 in the upward direction exceeds a predetermined threshold, the ball 52 is moved upwardly against the biasing force of the coil spring 50 and is seated on the part-spherical surface 46 of the valve seat 44, so that the communicating hole 48 of the valve seat 48 is closed fluid-tight by the ball 52 seated on the part-spherical surface 46 of the valve seat 44, thereby closing the fluid communication between the axially extending through-hole 35 of the fitting 34 and the fluid chamber 30, as shown in FIG. 4. Thus, the shut-off valve is brought to its closed state when the accumulator is placed in a state other than the normal operation state, that is, when the force acting on the ball 52 in the upward direction exceeds the predetermined threshold. In the closed state, the lower portion 53 of the through-hole 35 is disconnected from the fluid chamber 30.

Figure 3:
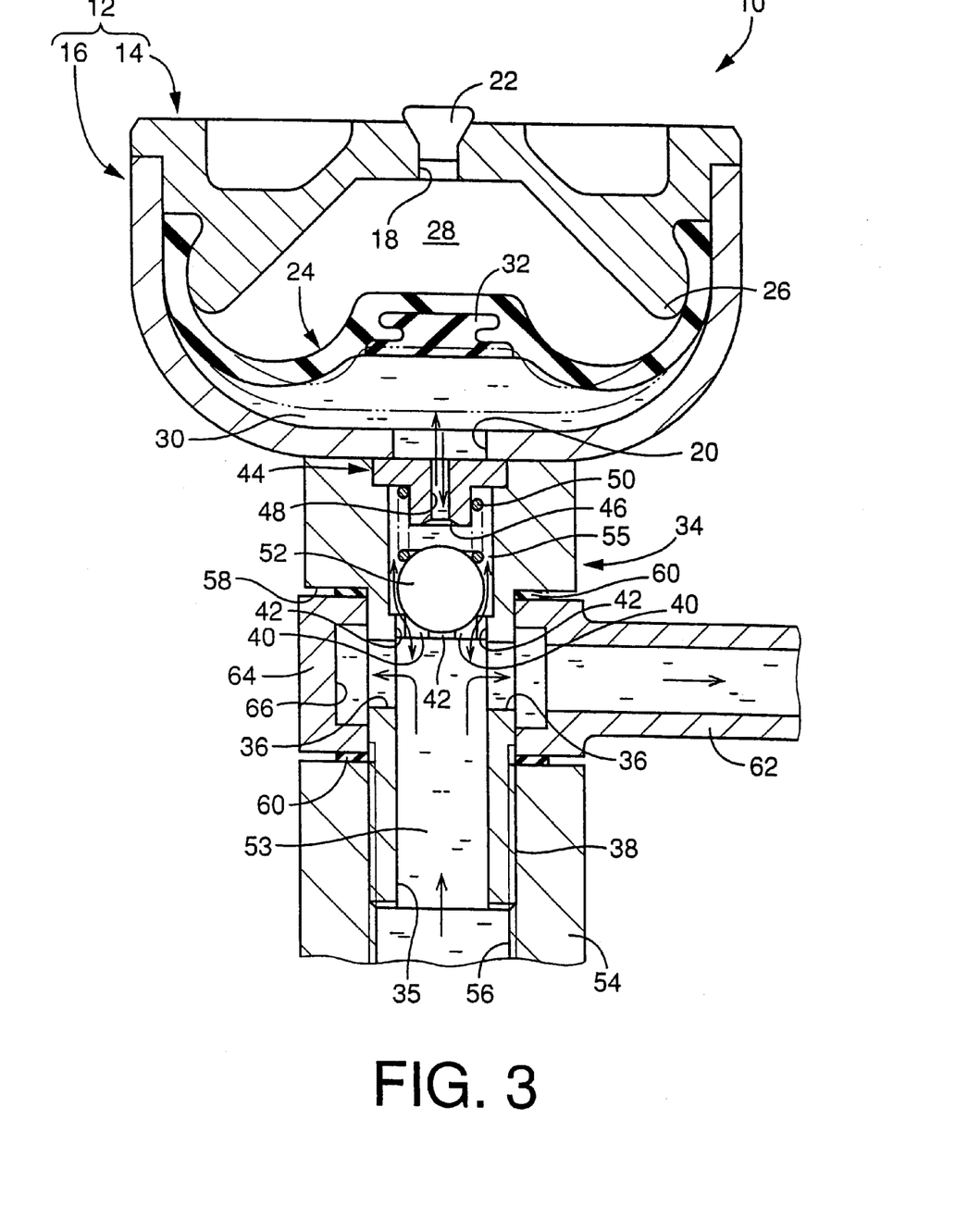
FIG. 3 is an elevational view in longitudinal or axial cross section showing the accumulator of FIG. 1 as connected to a hydraulic circuit, in one operating state of a valve incorporated therein while the fluid pressure in the piping system of the hydraulic circuit is not rapidly increasing.

The accumulator 10 constructed as described above is connected at the fitting 34 with a distributing pipe 62 and a delivery pipe 54 which constitute a part of the piping system of a hydraulic circuit, as shown in FIG. 3. The delivery pipe 54 is connected to a pump (not shown), while the distributing pipe 62 includes a tubular portion and a generally annular terminal portion 64 which is provided at an axial end of the distributing pipe 62. The generally annular terminal portion 64 is fitted on the diametrically small, lower portion of the fitting 34, such that the two radially extending through-holes 36 are vertically aligned with an annular groove 66 which is formed in the inner circumferential surface of the axially intermediate part of the terminal portion 64. The fitting 34 is screwed at its externally threaded portion 38 into an internally threaded portion 56 of the delivery pipe 54, so that the terminal portion 64 of the distributing pipe 62 is gripped by and between an annular shoulder face 58 connecting the outer circumferential surfaces of the respective upper and lower portions of the fitting 34, and the axial end face of the delivery pipe 54. A sealing member 60 is interposed between the shoulder face 58 of the fitting 34 and one of the axial end faces of the terminal portion 64, while another sealing member 60 is interposed between the other axial end face of the terminal portion 64 and the axial end face of the delivery pipe 54.

According to the arrangement as described above, the pressurized working fluid, which is delivered from the delivery pipe 54 into the lower portion 53 of the axially extending through-hole 35, is permitted to flow into the distributing pipe 62 through the two radially extending through-holes 36 and the annular groove 66 of the terminal portion 64 irrespective of whether the shut-valve is placed in the open or closed state, and also to flow into the upper portion 55 of the axially extending through-hole 35 through the above-described four recesses 42 when the shut-off valve is placed in the open state.

The biasing force of the coil spring 50 disposed within the axially extending through-hole 35 of the fitting 34 is suitably adjusted such that the ball 52 is held in contact or engagement with the four protrusions 40, namely, in its open position, when the pump connected to the axially extending through-hole 35 through the delivery pipe 54 is normally activated, and such that the ball 52 is moved towards the valve seat 44, namely, toward its closed position, when the delivery pressure of the pump is rapidly increased. In other words, the adjusted biasing force of the coil spring holds the ball 52 in engagement with the four protrusions 40 except when the fluid pressure in the axially extending through-hole 35 is rapidly increased at a rate higher than a predetermined upper limit, while permitting the movement of the ball 52 towards the valve seat 44 when the fluid pressure in the axially extending through-hole 35 is rapidly increased at a rate higher than the predetermined upper limit. In other words, the shut-off valve is held in its open state while the rate of increase of the fluid pressure in the piping system is lower than a predetermined upper limit, and is brought to its closed state when the rate of increase has exceeded the upper limit.

That is, in the accumulator 10, during the normal activation of the pump of the hydraulic circuit, when the fluid pressure in the delivery pipe 54 or in the lower portion 53 of the axially extending through-hole 35 of the fitting 34 is increased (but not at a rate higher than the above-described predetermined upper limit) due to the periodic change of the delivery pressure of the pump, the fluid flows from the lower portion 53 into the fluid chamber 30 through the four recesses 42, the upper portion 55 of the axially extending through-hole 35, the communicating hole 48 of the seat valve 44 and the fluid flow opening 20 of the vessel body 12, as shown in FIG. 3. The flow of the fluid into the fluid chamber 30 causes the flexible diaphragm 24 to be displaced in such a way that the volume of the gas chamber 28 is decreased. When the fluid pressure in the delivery pipe 54 or in the lower portion 53 of the axially extending through-hole 35 of the fitting 34 is reduced, on the other hand, the fluid flows from the fluid chamber 30 into the lower portion 53 through the fluid flow opening 20, the communicating hole 48, the upper portion 55 of the axially extending through-hole 35 and the four recesses 42, causing the flexible diaphragm 24 to be displaced in such a way that the volume of the gas chamber 28 is increased, as indicated by the two-dot chain line in FIG. 3.

Further, in the accumulator 10, when the fluid pressure in the delivery pipe 54 or in the lower portion 53 of the axially extending through-hole of the fitting 34 is rapidly increased at a rate higher than the predetermined upper limit as a result of the rapid increase in the delivery pressure of the pump, the ball 52 is seated onto the part-spherical surface 46 of the valve seat 44, as shown in FIG. 4, thereby closing the fluid communication between the axially extending through-hole 35 of the fitting 34 and the fluid chamber 30. The axially extending through-hole 35 of the fitting 34 serves as a communicating passage which communicates the delivery pipe 54 and the fluid chamber 30 of the vessel body 12.

According to the accumulator 10, as described above, during the normal activation of the pump of the hydraulic circuit, the flow of the fluid into the fluid chamber 30 or from the fluid chamber 30 causes the deformation of the flexible diaphragm 24, thereby changing the volume of the gas chamber 28. The change of the pressure in the gas chamber 28 due to the volumetric change of the gas chamber 28 functions to absorb the variations of the fluid pressure in the delivery pipe 54 or in the lower portion 53 of the axially extending through-hole 35 of the fitting 34. On the other hand, when the fluid pressure in the delivery pipe 54 or in the lower portion 53 of the axially extending through-hole 35 of the fitting 34 is rapidly increased as a result of the rapid increase in the delivery pressure of the pump, the function for absorbing the variations of the fluid pressure in the delivery pipe 54 or in the lower portion 53 of the axially extending through-hole 35 is immediately suspended or inhibited.

Therefore, the thus constructed accumulator 10 is effective not only to absorb or reduce the pulsating flow of the fluid thereby minimizing the vibrations and noises caused by the pulsating flow during the normal activation of the pump of the hydraulic circuit, but also to permit the rapid increase in the fluid pressure precisely when the rapid generation of the large hydraulic force in the hydraulic circuit is required, thereby efficiently providing the required large force.

Further, in the present accumulator 10, the fitting 34 providing the communicating passage between the fluid chamber 30 and the delivery pipe 54 which is a part of the piping system, is directly attached to the delivery pipe 54 and the distributing pipe 62 which is also a part of the piping system, without any additional member. Thus, the accumulator 10 can be easily attached to the piping system or installed in the hydraulic circuit in a simplified manner.

Still further, in the accumulator 10, the annular-shaped, projecting portion 26 which cooperates with the lower member 16 to fixedly grip therebetween the flexible diaphragm 24, has an inner circumferential surface which has a shape corresponding to the upwardly deformed shape of the flexible diaphragm 24 upon the flow of the fluid into the fluid chamber 30. This shape of the inner circumferential surface of the projecting portion 26 prevents a local stress concentration in the margin of the gripped portion of the flexible diaphragm 24 which is adjacent to the non-gripped portion of the flexible diaphragm 24, resulting in an improved durability of the flexible diaphragm 24.

The accumulator 10 having the above-described features may be advantageously applied to the hydraulic circuit of a hydraulic steering system for a motor vehicle or other hydraulic circuit.

In a hydraulic steering system for a motor vehicle, it is generally required or desired to minimize the vibrations or noises caused by the pulsating flow, during a slow or gradual steering operation, namely, when the fluid pressure is not rapidly increased. However, the driver of the vehicle does not generally care or is not sensitive to the vibrations or noises when the fluid pressure is rapidly increased as a result of a rapid or emergency steering operation. In the latter case, it is the most important for the hydraulic steering system to rapidly obtain a sufficiently large steering force. With the installation of the present accumulator 10 in the hydraulic steering system, the vibrations or noises caused by the pulsating flow are reduced during the slow steering operation, while the sufficiently large steering force is reliably obtained upon the rapid steering operation, resulting in an outstandingly improved steering performance of the hydraulic steering system.

To further clarify the advantage of the accumulator 10 of the present invention, a test was conducted by the present inventors as described below.

In the test, two different types of accumulators were used. One of the two accumulators had a construction identical to that of the accumulator 10 of FIG. 1, while the other was a known accumulator having a construction which was partly different from that of the accumulator 10. The known accumulator includes the vessel body 12 which has that same construction as in the accumulator 10, and the fitting 34 which is fixed at the center of the lower face of the vessel body 12 as in the accumulator 10. However, the known accumulator is different from the accumulator 10 in that the four protrusions 40, the four recesses 42, the ball 52, the coil spring 50 and the seat valve 44 are not provided in the axially extending through-hole 35 of the fitting 34.

Figure 5:
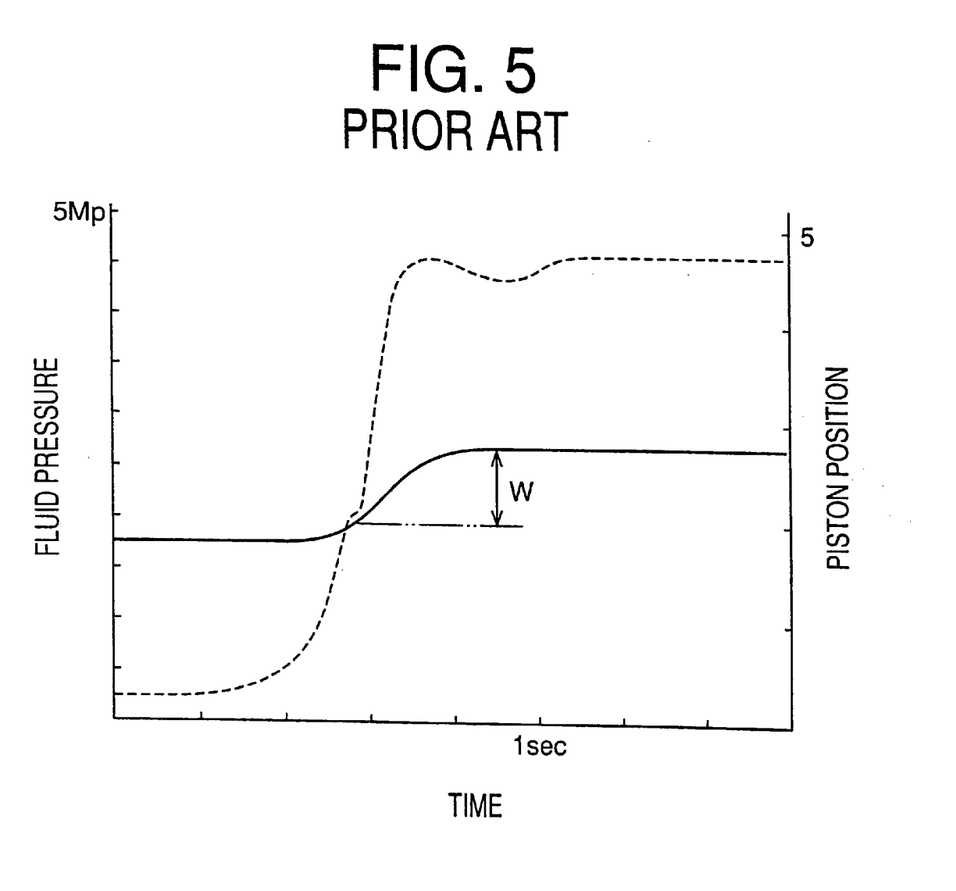
FIG. 5 is a graph showing chronological changes of the fluid pressure and the piston position of a hydraulic cylinder in a test hydraulic circuit device in which a conventional accumulator is installed.
Figure 6:
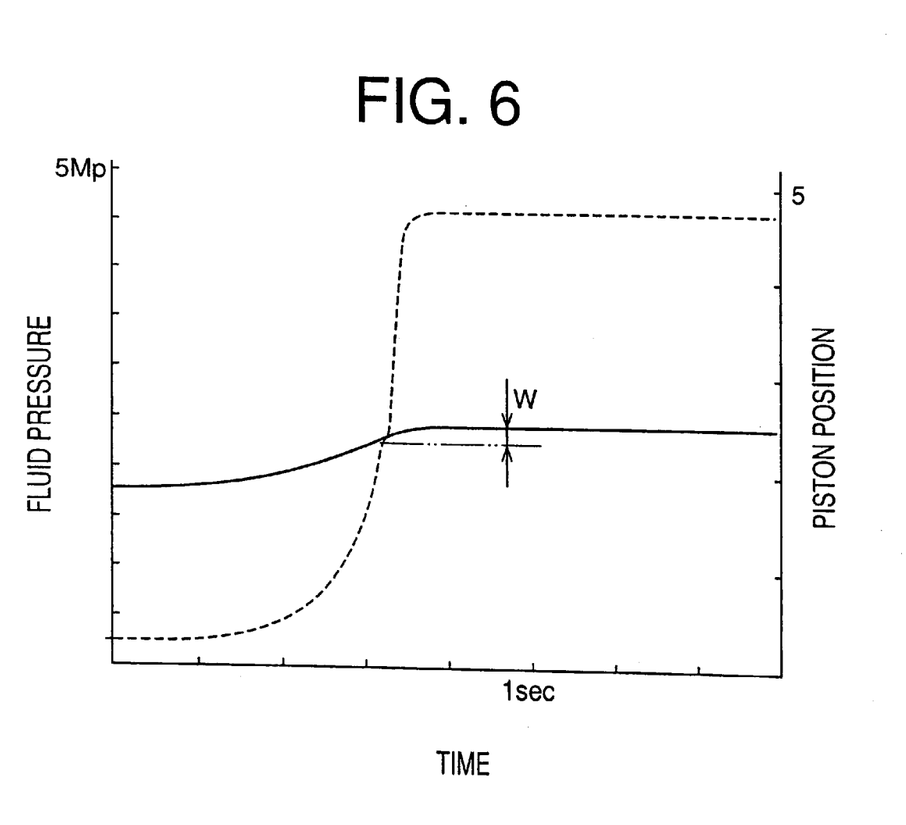
FIG. 6 is a graph showing chronological changes of the fluid pressure and the piston position of the hydraulic cylinder in the test hydraulic circuit device in which the accumulator of FIG. 1 is installed.

Each of the two types of accumulators was installed in a test hydraulic circuit device, for observing the chronological changes of the fluid pressure and the amount of the fluid flow, when the fluid pressure was intended to be rapidly increased. The change of the amount of the fluid flow was estimated in accordance with the displacement of the piston of a hydraulic cylinder installed in the test device. FIG. 5 is a graph showing a result of the test where the known accumulator is installed in the test hydraulic circuit device. FIG. 6 is a graph showing a result of the test where the accumulator 10 of the invention is installed in the test hydraulic circuit device. In the graphs of FIGS. 5 and 6, the broken line indicates the fluid pressure, while the solid line indicates the position of the piston of the hydraulic cylinder. The displacement amount W, which is represented by the distance between the solid line and the two-dot chain line, corresponds to the estimated amount of the fluid flow into the accumulator which amount was estimated on the basis of the distance over which the piston had been displaced during the rapid increase in the fluid pressure.

In the test hydraulic circuit device in which the known accumulator was installed, the fluid pressure was once momentarily reduced after the fluid pressure had been rapidly increased, and the estimated amount of the fluid flow into the accumulator was comparatively large, as shown in FIG. 5. In the test hydraulic circuit device in which the accumulator 10 of the present invention was installed, the momentary reduction in the fluid pressure was not seen at all, and the estimated amount of the fluid flow into the accumulator 10 was extremely small, as shown in FIG. 6.

Thus, the test revealed that the accumulator 10 was effective to permit the rapid increase in the fluid pressure when the rapid generation of the large hydraulic force in the hydraulic circuit was required, thereby efficiently providing the hydraulic circuit with the required large hydraulic force.

Figure 7:
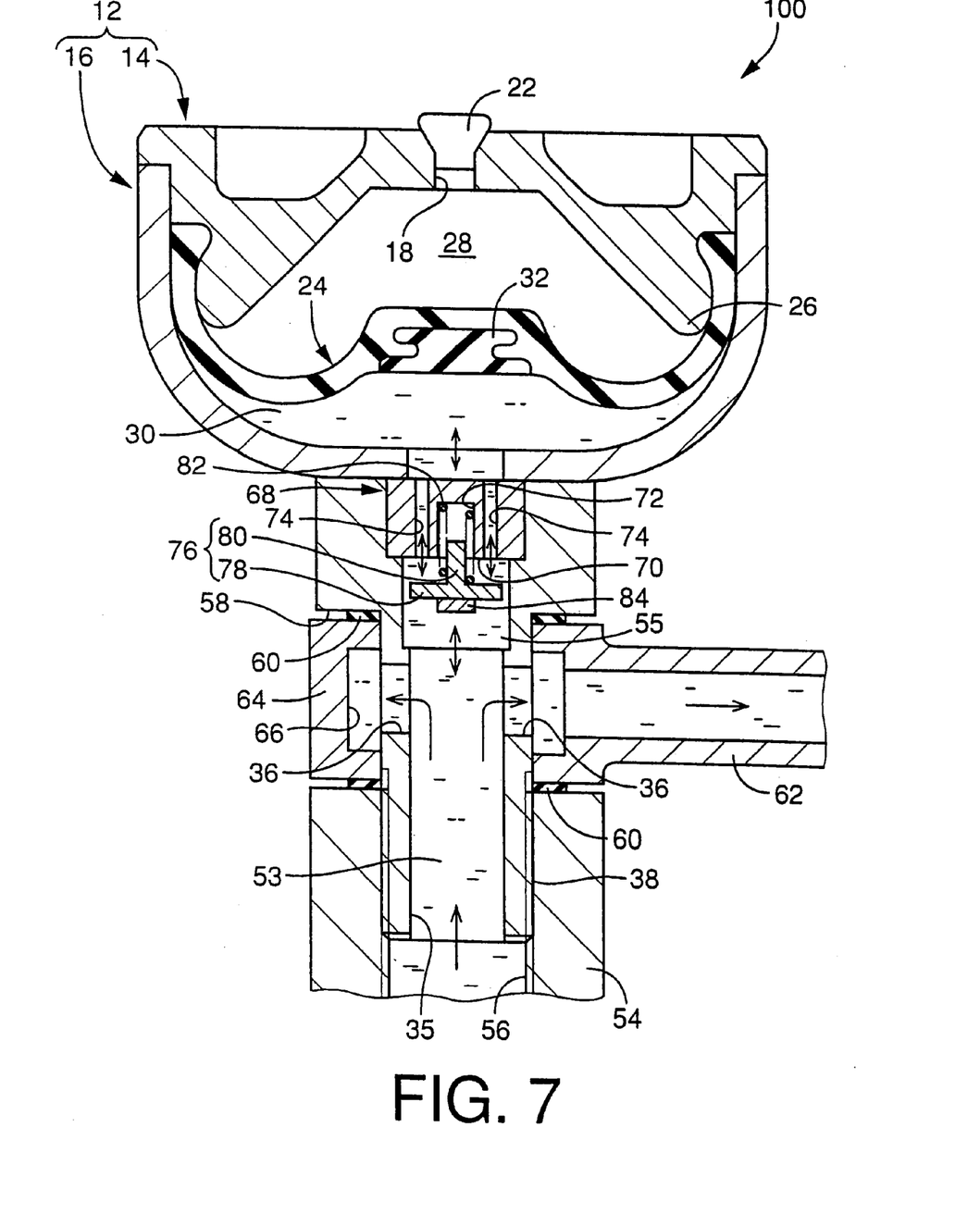
FIG. 7 is an elevational view in longitudinal or axial cross section showing an accumulator constructed according to a second embodiment of the present invention, as connected to a hydraulic circuit, in one operating state of its valve while the fluid pressure in the piping system of the hydraulic circuit is not rapidly increasing.
Figure 8:
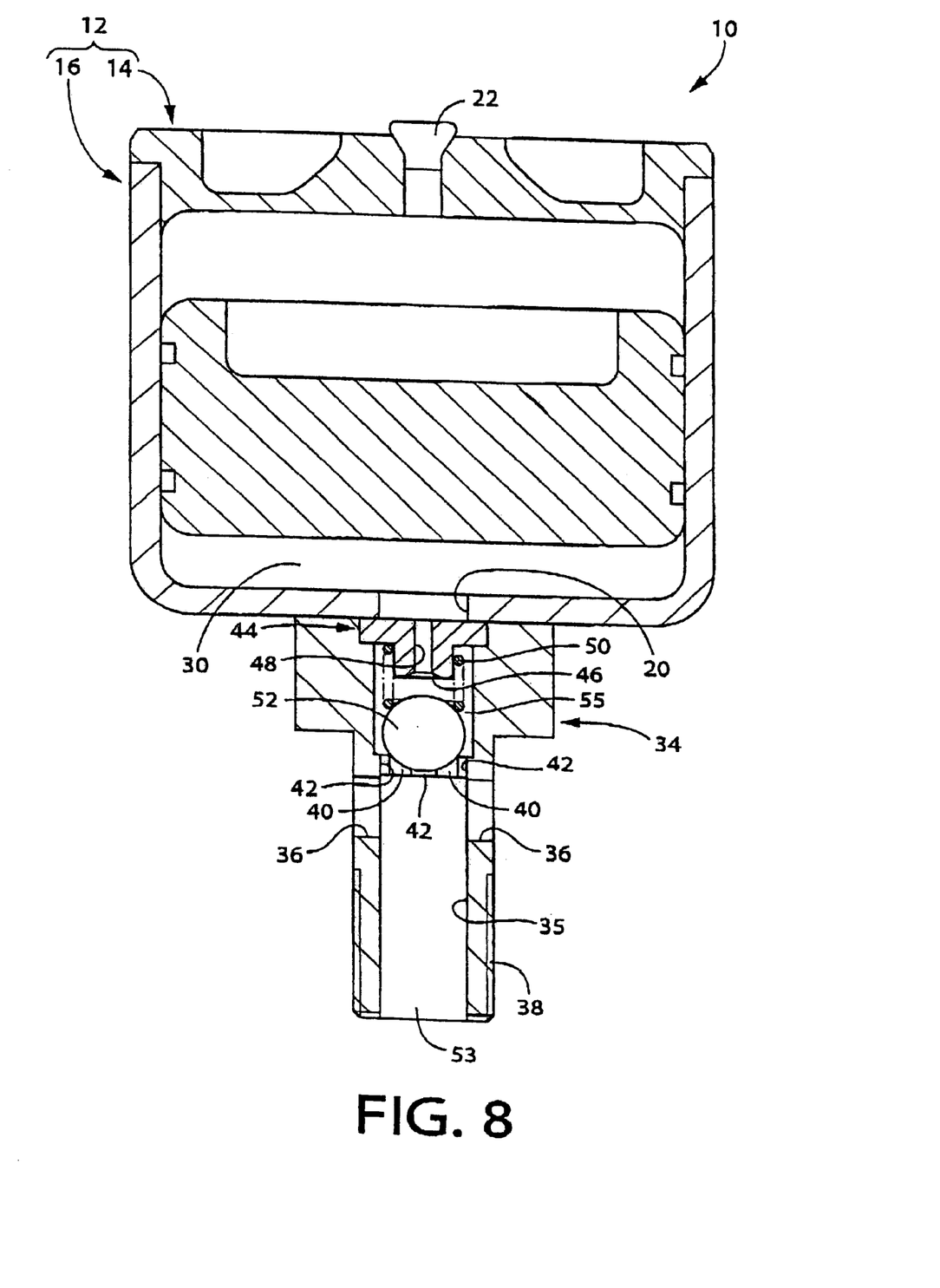
FIG. 8 is an elevational view in longitudinal or axial cross-section showing an accumulator according to another embodiment of the present invention, wherein the deformable partition member takes the form of a piston member.

Referring next to FIG. 7, there will be described an accumulator 100 constructed according to a second embodiment of this invention. The present accumulator 100 is identical to the accumulator 10 of the first embodiment, except in construction of the opening and closing device provided in the communicating passage. In the following description as to the second embodiment, the same reference numerals as used in the first embodiment will be used to identify the functionally corresponding elements, and redundant descriptions of those elements will not be provided.

According to the accumulator 100 of the second embodiment, the valve member takes the form of a stepped cylindrical valve 76 consisting of a head portion 78 and a shaft portion 80 which is integrally formed at the center of the head portion 78 and axially extends over a predetermined distance. A valve seat 68 is disposed in the upper open end portion of the axially extending through-hole 35, in the substantially same manner as the valve seat 44 of the accumulator 10 of the first embodiment. The valve seat 68 has at its center an accommodation hole 72 which opens in a lower surface 70 of the valve seat 68. The valve seat 68 further has a plurality of communicating holes 74 which are formed through the valve seat 68 and positioned around the accommodation hole 72. The shaft portion 80 of the valve 76 is introduced into a coil spring 82 which serves as the biasing mechanism, and the shaft portion 80 is then accommodated together with the coil spring 82 in the accommodation hole 72 of the valve seat 68, so that the valve 76 is disposed in the axially extending through-hole 35 which serves as the communicating passage, being biased in the downward direction by the biasing force generated by the coil spring 82. The downward movement of the valve 76 is limited by a stop portion 84 which protrudes from the inner circumferential surface of the fitting 34, such that the downward moving valve 76 is stopped by the stop portion 84 at a predetermined position. When the fluid pressure is rapidly increased, the valve 76 is moved against the biasing force of the coil spring 82 towards the fluid chamber 30, so as to be seated on the lower surface 70 of the valve seat 68. Thus, the plurality of communicating holes 74 are closed by the head portion 70 which has a size enough to cover the communication holes 74.

While the embodiments of the present invention have been described above for illustrative purpose only, it is to be understood that the present invention is not limited to the details of the above-described embodiments but may be embodied with various changes, modifications and improvements.

For example, while the vessel body 12 of the accumulator 10 or the accumulator 100 in the above-illustrated embodiments has the cup shape, the shape of the vessel body is not particularly limited. Further, while the flexible diaphragm 24 which divides the inner space of the vessel body 12 into the two fluid-tight sections is made of the material composed of a resin and a rubber, the flexible diaphragm 24 may be made of any other material.

In the above-illustrated embodiments, the fitting 34 is fixed to the vessel body 12 so as to constitute a part of the accumulator 10 or the accumulator 100, and the axially extending through-hole 35 formed through the fitting 34 serves as the communicating passage for communicating the fluid chamber 30 of the vessel body 12, the delivery pipe 54 and the distributing pipe 62. However, the fitting 34 may be replaced with any other member which constitutes a part of the accumulator, so that the fluid chamber 30, the delivery pipe 54 and the distributing pipe 62 are communicated through a communicating passage which is formed in the member.

While the valve member which is movably disposed in the communicating passage takes the form of the ball 52 or the stepped cylindrical valve 76 in the above-illustrated embodiments, the shape of the valve member may be suitably modified depending upon the shape of the lower surface 46 of the valve seat 44 with which the valve member is brought into contact.

The opening and closing device provided in the communicating passage is not limited to the details in the above-illustrated embodiments. It is possible to employ any other device for alternately opening and closing the communicating passage.

While the biasing mechanism for biasing the valve member 52 or 76 in the direction in which the working fluid is discharged from the fluid chamber 30 is constituted by the coil spring 50 or 82 in the above-illustrated embodiments, the biasing mechanism may be constituted by any other known member which is capable of biasing the valve member with a suitable biasing force.

In the above-illustrated embodiments, the four protrusions 40 or the stop portion 84 are provided to serve as the stop mechanism for limiting the amount of the downward movement of the valve member 52 or 76. However, the valve member may be fixed to the coil spring or other biasing mechanism thereby limiting the amount of the downward movement of the valve member. In this case, the protrusions 40 or the stop portion 84 are not essential.

In the above-illustrated embodiments, the present invention is applied to the diaphragm type accumulator in which the partition member for fluid-tightly dividing the vessel body into the gas chamber and the fluid chamber is constituted by the flexible diaphragm. However, it is to be understood that the principle of the present invention may be applied to a piston type accumulator in which the partition member is constituted by a piston member movably disposed in the vessel body, a bellows or bladder type accumulator in which the partition member is constituted by a deformable bellows or bladder member, or any other type accumulator which is adapted to minimize the variations of the fluid pressure in a hydraulic circuit by the variations of the pressure in the gas chamber as a result of the fluid communication between the fluid chamber and the piping system.

It is to be understood that the present invention may be embodied with various other changes, modifications and improvements, which may occur to those skilled in the art, without departing from the spirit and scope of the present invention defined in the following claims:

What is claimed is:

1. An accumulator connectable to a piping system of a hydraulic circuit, for minimizing variations of the pressure of a working fluid in said piping system, comprising:

a vessel body having an inner space;

a displaceable partition member fixedly disposed in said inner space so as to fluid-tightly divide said inner space into a gas chamber charged with a suitable pressurized gas, and a fluid chamber connectable through a communicating passage with said piping system for permitting flows of said working fluid through said communicating passage between said piping system and said fluid chamber in response to said variations, so as to minimize said variations, said communicating passage including a first portion and a second portion wherein said second portion is nearer to said fluid chamber than said first portion as viewed in a direction in which said communicating passage extends; and an opening and closing device for opening and closing said communicating passage, said opening and closing device being disposed in said second portion of said communicating passage, and including a valve member movable in opposite directions and a valve seat located on one of opposite sides of said valve member which is remote from said first portion of said communicating passage, said communicating passage being opened by a first movement of said valve member in one of said opposite directions away from said valve seat thereby to permit said flows of said working fluid between said piping system and said fluid chamber except when a rate of increase of said pressure of said working fluid is higher than a predetermined upper limit, said communicating passage being closed by a second movement of said valve member in another of said opposite directions toward said valve seat thereby to inhibit said flows of said working fluid between said piping system and said fluid chamber when said rate is higher than said predetermined upper limit.

2. An accumulator according to claim 1, wherein said opening and closing device comprises a shut-off valve including a valve member which is movable in two opposite directions, so that said communicating passage is opened by a first movement of said valve member in one of said two opposite directions in which said working fluid is discharged from said fluid chamber into said piping system, and so that said communicating passage is closed by a second movement of said valve member in the other of said two opposite directions.

3. An accumulator according to claim 2, wherein said opening and closing device further comprises a biasing mechanism which biases said valve member in said one of said two opposite directions with a biasing force, such that said valve member is held by said biasing force in an open position thereof after said first movement, except when said rate of increase of said pressure of said working fluid is higher than said upper limit, and such that said second movement of said valve member to a closed position thereof in said other of said two opposite directions against said biasing force is permitted when said rate of increase is higher than said upper limit.

4. An accumulator according to claim 3, wherein said biasing mechanism comprises a compression coil spring.

5. An accumulator according to claim 3, wherein said shut-off valve further includes a valve seat having at least one communicating hole formed therethrough for fluid communication with said fluid chamber and said communicating passage, said valve member being seated on said valve seat so as to close said at least one communicating hole, as a result of said second movement of said valve member to said closed position, when said rate of increase of said pressure of said working fluid is higher than said upper limit.

6. An accumulator according to claim 5, wherein said valve member consists of a stepped cylindrical member movably disposed in said communicating passage, said stepped cylindrical member including a head portion having a flat end face, and a shaft portion having a smaller diameter than said head portion and extending from a center of said flat end face of said head portion, and wherein said valve seat has a central accommodation hole, said shaft portion being moved into said accommodation hole while said head portion is seated on said seat member at said closed position so as to close said at least one communicating hole.

7. An accumulator according to claim 5, further comprising a stop mechanism which limits an amount of said first movement of said valve member in said one of said two opposite directions.

8. An accumulator according to claim 5, wherein said valve member consists of a ball movably disposed in said communicating passage, and wherein said valve seat has a part-spherical contact surface which is concaved in said other of said two directions so that said ball is fluid-tightly engageable with said contact surface when said ball is moved to said closed position.

9. An accumulator according to claim 8, further comprising a stop mechanism which limits an amount of said first movement of said ball, said stop mechanism including a plurality of protrusions which are located on one of opposite sides of said ball which is remote from said valve seat, each of said protrusions protruding radially inwardly from an inner circumferential surface of a cylindrical wall which defines said communicating passage, said plurality of protrusions being spaced apart from each other in a circumferential direction of said cylindrical wall, and wherein said ball has a diameter larger than that of a circle generally defined by radially inner ends of said plurality of protrusions.

10. An accumulator according to claim 1, further comprising a fitting having an axially extending through-hole formed therethrough and attached to said vessel body such that said fluid chamber is connectable to said piping system through said axially extending through-hole which serves as said communicating passage.

11. An accumulator according to claim 10, wherein said fitting includes a diametrically large portion and a diametrically small portion which is located on one of axially opposite sides of said diametrically large portion which is remote from said vessel body, an outer circumferential surface of said diametrically large portion and an outer circumferential surface of said diametrically small portion being connected by an annular shoulder face which is substantially perpendicular to an axial direction of said fitting, said diametrically small portion having an externally threaded distal end portion for fluid-tight communication with said piping system, and an axially intermediate portion having at least one radially extending through-hole formed through a cylindrical wall thereof so as to extend in a radial direction of said fitting, for fluid-tight communication with said piping system.

12. A hydraulic system comprising:
an accumulator defined in claim 11;
a distributing pipe including a tubular portion and a generally annular terminal portion at an axial end thereof, said generally annular terminal portion having an axis substantially perpendicular to an axis of said tubular portion, an inside diameter substantially equal to an outside diameter of said diametrically small portion of said fitting, and an annular groove which is formed in an inner circumferential surface of an axially intermediate part thereof and which communicates with a distributing passage of said tubular portion, said distributing pipe being attached to said fitting, such that said generally annular terminal portion is fitted on said diametrically small portion, such that one of axially opposite faces of said generally annular terminal portion is in contact with said annular shoulder face of said fitting, and such that said annular groove communicates with said at least one radially extending through-holes of said fitting; and
a delivery pipe connected at one end thereof to a pump and having an internally threaded end portion remote from said one end, said internally threaded end portion being screwed onto said externally threaded distal end portion of said fitting such that said generally annular terminal portion of said delivery pipe is gripped by and between said annular shoulder face and an axial end face of said internally threaded end portion.

13. An accumulator according to claim 1, wherein said displaceable partition member is a flexible diaphragm.

14. An accumulator according to claim 1, wherein said displaceable partition member is a piston member.

15. An accumulator connectable to a piping system of a hydraulic circuit, for minimizing variations of the pressure of a working fluid in said piping system, comprising:
a vessel body having an inner space;
a displaceable partition member fixedly disposed in said inner space so as to fluid-tightly divide said inner space into a fluid chamber and a gas chamber which is charged with a suitable pressurized gas;
means for defining a communicating passage which communicates with said piping system and said fluid chamber for permitting flows of said working fluid through said communicating passage between said piping system and said fluid chamber in response to said variations so as to minimize said variations;
said means for communicating having a first portion and a second portion wherein said second portion is nearer to said fluid chamber than said first portion as viewed in a direction in which said communicating passage extends;
an opening and closing device for opening and closing said communicating passage, said opening and closing device being disposed in said second portion of said communicating passage, and including a valve member movable in opposite directions and a valve seat located on one of opposite sides of said valve member which is remote from said first portion of said communicating passage, said communicating passage being opened by a first movement of said valve member in one of said opposite directions away from said valve seat thereby to permit said flows of said working fluid between said piping system and said fluid chamber except when a rate of increase of said pressure of said working fluid is higher than a predetermined upper limit, said communicating passage being closed by a second movement of said valve member in another of said opposite directions toward said valve seat thereby to inhibit said flows of said working fluid between said piping system and said fluid chamber when said rate is higher than said predetermined upper limit;
and wherein said communicating passage includes a distributing port and a delivery port which is connected to a pressure fluid source, and wherein said distributing port and said delivery port are located in said first portion of said communicating passage while said opening and closing device is located in said second portion of said communicating passage, so that flows of said working fluid from said delivery port to said distributing port is permitted irrespective of whether said opening and closing device is placed in open or closed state thereof.

16. An accumulator connectable to a piping system of a hydraulic circuit, for minimizing variations of the pressure of a working fluid in said piping system, comprising:
a vessel body having an inner space;
a displaceable partition member fixedly disposed in said inner space so as to fluid-tightly divide said inner space into a fluid chamber and a gas chamber which is charged with a suitable pressurized gas;
means for defining a communicating passage which communicates with said piping system and said fluid chamber for permitting flows of said working fluid through said communicating passage between said piping system and said fluid chamber in response to said variations so as to minimize said variations;
said means for communicating having a first portion and a second portion wherein said second portion is nearer to said fluid chamber than said first portion as viewed in a direction in which said communicating passage extends;
an opening and closing device for opening and closing said communicating passage, said opening and closing device being disposed in said second portion of said communicating passage, and including a valve member movable in opposite directions and a biasing mechanism biasing said valve member in one of said opposite directions in which said working fluid is discharged from said fluid chamber toward said piping system, said communicating passage being opened by a first movement of said valve member in said one of said opposite directions thereby to permit said flows of said working fluid except when a rate of increase of said pressure of said working fluid is higher than a predetermined upper limit, said communicating passage being closed by a second movement of said valve member in another of said opposite directions against said biasing force thereby to inhibit said flows of said working fluid is higher than said predetermined upper limit;

and wherein said communicating passage includes a distributing port and a delivery port which is connected to a pressure fluid source, and wherein said distributing port and said delivery port are located in said first portion of said communicating passage while said opening and closing device is located in said second portion of said communicating passage, so that flows of said working fluid from said delivery port to said distributing port is permitted irrespective of whether said opening and closing device is placed in open or closed state thereof.

* * * * *